(12) United States Patent
Frid

(10) Patent No.: US 7,489,088 B2
(45) Date of Patent: Feb. 10, 2009

(54) POWER SUPPLY FOR 2-LINE DIMMER

(75) Inventor: Eugene Frid, Great Neck, NY (US)

(73) Assignee: Leviton Manufacturing Co., Ltd., Little Neck, NY (US)

( * ) Notice: Subject to any disclaimer, the term of this patent is extended or adjusted under 35 U.S.C. 154(b) by 81 days.

(21) Appl. No.: 11/553,433

(22) Filed: Oct. 26, 2006

(65) Prior Publication Data

US 2007/0126366 A1    Jun. 7, 2007

Related U.S. Application Data

(60) Provisional application No. 60/730,981, filed on Oct. 27, 2005.

(51) Int. Cl.
    *H05B 41/16* (2006.01)
(52) U.S. Cl. .............. 315/287; 315/291; 315/224; 315/DIG. 4; 323/282; 323/226
(58) Field of Classification Search ............ 315/200 R, 315/206, 208, 287, 291, 362, DIG. 4; 323/220, 323/226, 235, 330, 282; 363/89, 125–127
See application file for complete search history.

(56) References Cited

U.S. PATENT DOCUMENTS

| | | | | |
|---|---|---|---|---|
| 4,334,184 A * | 6/1982 | Hauenstein | ............... | 323/235 |
| 4,504,778 A * | 3/1985 | Evans | ............... | 323/323 |
| 4,678,985 A * | 7/1987 | Moskin | ............... | 323/324 |
| 4,684,819 A * | 8/1987 | Haag et al. | ............... | 315/82 |
| 5,113,120 A * | 5/1992 | Scott et al. | ............... | 315/77 |
| 5,475,580 A | 12/1995 | Noro | | |
| 5,600,552 A * | 2/1997 | McCavit et al. | ............... | 363/89 |
| 5,801,492 A * | 9/1998 | Bobel | ............... | 315/244 |
| 6,218,787 B1 * | 4/2001 | Murcko et al. | ............... | 315/194 |
| 6,969,959 B2 * | 11/2005 | Black et al. | ............... | 315/307 |
| 7,091,672 B2 * | 8/2006 | Steffie et al. | ............... | 315/282 |
| 2002/0057080 A1 | 5/2002 | Telefus et al. | | |

OTHER PUBLICATIONS

PCT International Search Report and Written Opinion for PCT/US06/60319 dated Apr. 1, 2008.

* cited by examiner

*Primary Examiner*—Haissa Philogene
(74) *Attorney, Agent, or Firm*—Carter, DeLuca, Farrell & Schmidt, LLP

(57) ABSTRACT

A power supply circuit for a dimmer switching device includes a voltage doubler circuit, a filter circuit, a switching power supply, and a linear regulator circuit. In one embodiment, the voltage doubler circuit includes a first stage having a first capacitor and a first diode, and a second stage having a second capacitor and a second diode. The switching power supply may include a feedback circuit, and may be a non-isolated power supply. In an embodiment, the dimmer device is variable between an OFF position and a full ON position, and the circuit is effective to provide power for operation of the switching power supply while the dimmer device is in the full ON position.

34 Claims, 3 Drawing Sheets

US 7,489,088 B2

POWER SUPPLY FOR 2-LINE DIMMER

This application claims the benefit of U.S. Provisional Application No. 60/730,981, filed Oct. 27, 2005.

FIELD OF THE INVENTION

The present invention relates generally to power supplies utilized in lighting control applications and, more specifically, to power supplies used to power internal dimmer circuits.

BACKGROUND OF THE INVENTION

A common application for a light dimmer is a two wire connection. A block diagram of a typical two wire connection is shown in FIG. 1. In this particular case, dimmer's switching element 15 is connected between line terminal 11 and a load 16. The neutral terminal 12 is connected to the other side of the load. The dimmer's power supply 18 is connected across the switching element terminals. Design of this type of power supply represents a challenge as utilization of the available AC power source depends on the status of the load. AC input can be utilized only when the dimmer's switching element is OFF; this happens only during a period of time around the zero crossing. This time is minimal when the dimmer is set for maximum brightness. FIG. 2 represents an example of a dimmer AC waveform 20 where a triac is utilized as a switching element. Time periods 22 (T1 to T2, etc.) represent the time that the load is ON. Time periods 21 (T0 to T1, T2 to T3, etc.) represent the time that the load is OFF, during which AC line power is available for the dimmer's power supply. This limits the amount of power available for power supply 18. A similar problem may arise in home energy management systems, in which the power switching device is placed in series with a 24V or 120V power source and a load (as discussed in U.S. Pat. No. 4,678,985).

Conventional power supplies for two line dimmers are often based on a linear analog approach, including different capacitor charging schemes with a linear post regulation. Examples of power supplies utilizing this approach are shown in U.S. Pat. Nos. 4,334,184; 4,504,778; 4,678,985; and 5,600,552. These designs have a number of drawbacks, including need for bulky components and inefficiency, as they continuously dissipate energy and draw current while the device is in its OFF state. The implementation cost of linear power supplies may also be high.

A switching power supply can avoid the above-noted problems. A switch mode power supply regulates by connecting high input voltage to the low voltage power supply circuit for a short period of time. In a common approach, when a power supply switching element (such as a transistor) turns on, energy is delivered to an inductor, and in some cases to the output capacitor and a load. When the transistor turns off, the stored energy in the inductor is delivered to an output filter capacitor and a load. When the transistor conducts, it operates at full current with minimum voltage drop, which results in little wasted power.

The minimum operating voltage of the power supply switching device represents a design restriction which becomes critical for two wire lighting applications. As shown in FIG. 2, since the AC input power can be utilized only during short intervals of time while the load is OFF, peak voltage levels which develop during this time may not be high enough for the power supply to operate properly. Any increase in the power supply input voltage level will significantly improve its performance. In addition, implementation of a dimmer's switching power supplies can be further restricted by a common requirement for an unobstructed access to the line terminal.

The present invention offers a solution that overcomes both of these problems.

SUMMARY OF THE INVENTION

The present invention addresses the above-noted problems by providing a switching power supply circuit in which the input voltage level is increased, thereby improving the performance of the switching power supply. A voltage multiplier such as a voltage doubler circuit is introduced between the load switching device and the input to the switching power supply. The voltage multiplier permits stable operation of the power supply even at low voltages.

According to an aspect of the invention, a power supply circuit for providing power to internal circuits of a lighting dimmer device is adapted to be connected to a source of potential; the power supply circuit includes a voltage multiplier, a switching power supply, and a linear post regulator. The voltage multiplier is adapted to be coupled to the source of potential to provide an output signal of at least double the source of potential; the switching power supply is coupled to the voltage multiplier to receive the multiplied voltage as an input. The linear post regulator is interposed between the switching power supply and the internal circuits of the dimmer device.

According to another aspect of the invention, a power supply circuit for connection to a lighting dimmer device is provided which includes a voltage doubler circuit, a filter circuit, a switching power supply, and a linear regulator circuit In one embodiment, the voltage doubler circuit includes a first stage having a first capacitor and a first diode, and a second stage having a second capacitor and a second diode. The switching power supply may include a feedback circuit, and may be a non-isolated power supply. In an embodiment, the dimmer device is variable between an OFF position and a full ON position, and the circuit is effective to provide power for operation of the switching power supply while the dimmer device is in the full ON position.

DETAILED DESCRIPTION OF PREFERRED EMBODIMENTS

Figure 3:
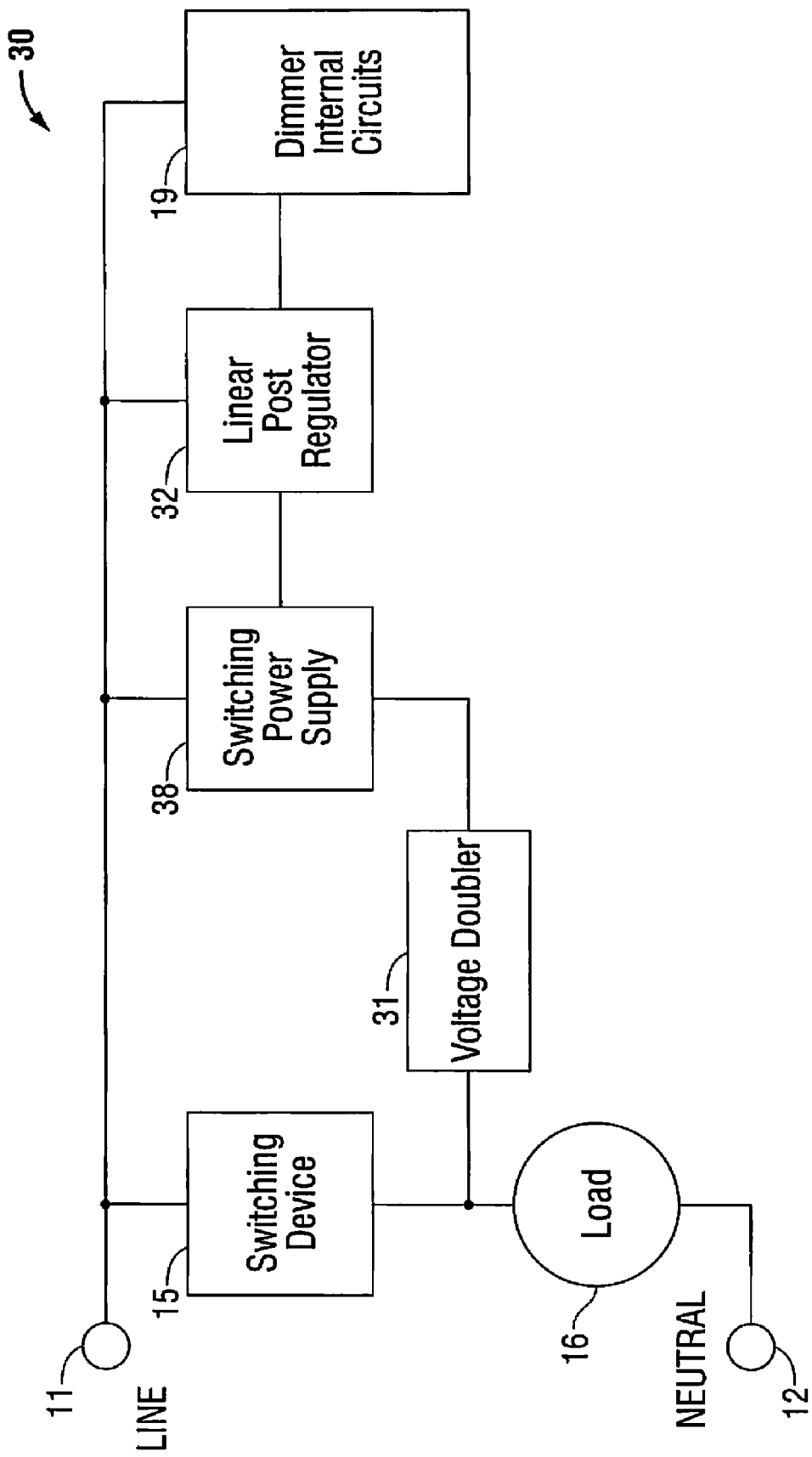
FIG. 3 is a block diagram of a switching power supply circuit in accordance with an embodiment of the invention.

FIG. 3 shows a block diagram of a switching power supply 30 according to an embodiment of the invention. In this embodiment, a voltage multiplier such as a voltage doubler is used to increase the input voltage level of the power supply, thereby assuring proper operation of the power supply even when the dimmer is at its full ON position. A voltage doubler circuit 31 is connected between the switching device 15 and the input to the switching power supply 38. This arrangement permits direct access to the line terminal 11 for various components of the dimmer providing other optional dimmer functions such as communication to remote devices. Other voltage multiplication circuits besides voltage doublers (e.g. 3×) may also be used. A linear post regulator 32 may be advantageously placed between the output of power supply 38 and the dimmer internal circuits 19. Noise sensitive dimmer circuits may particularly benefit from an additional linear post regulator.

Figure 1:
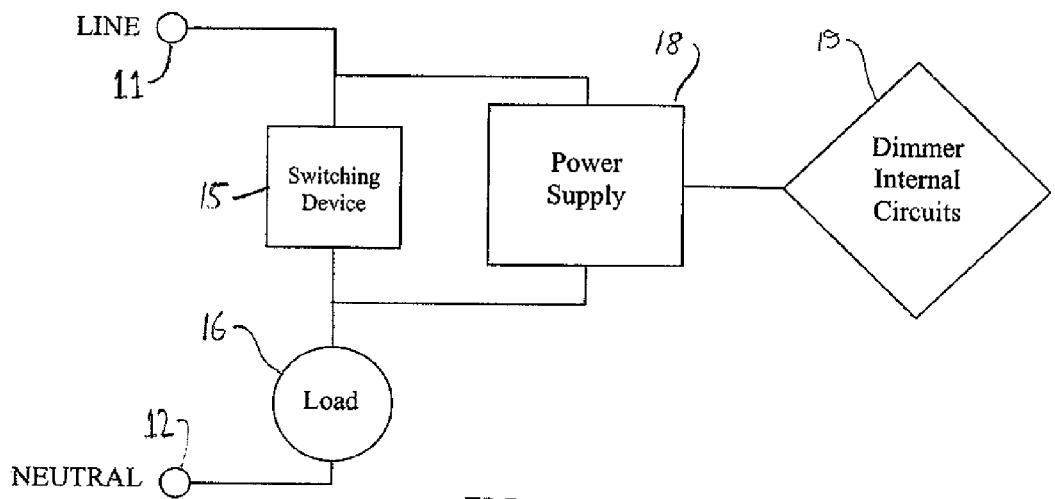
FIG. 1 is a block diagram of a conventional two wire connection circuit for a dimmer.
Figure 2:
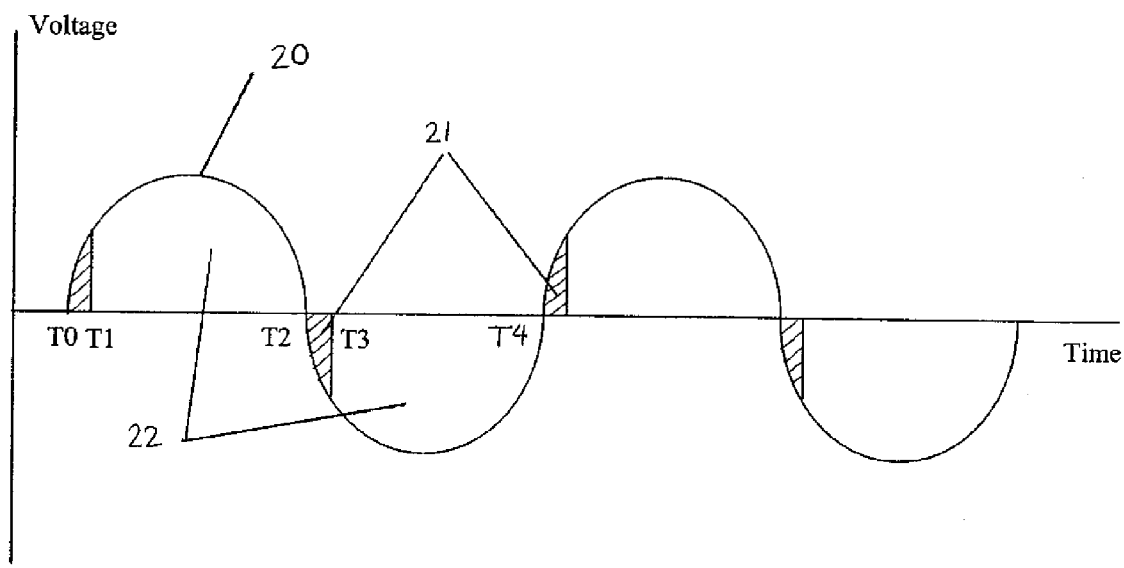
FIG. 2 shows an AC waveform in a dimmer circuit with a triac switching element at full load.
Figure 4:
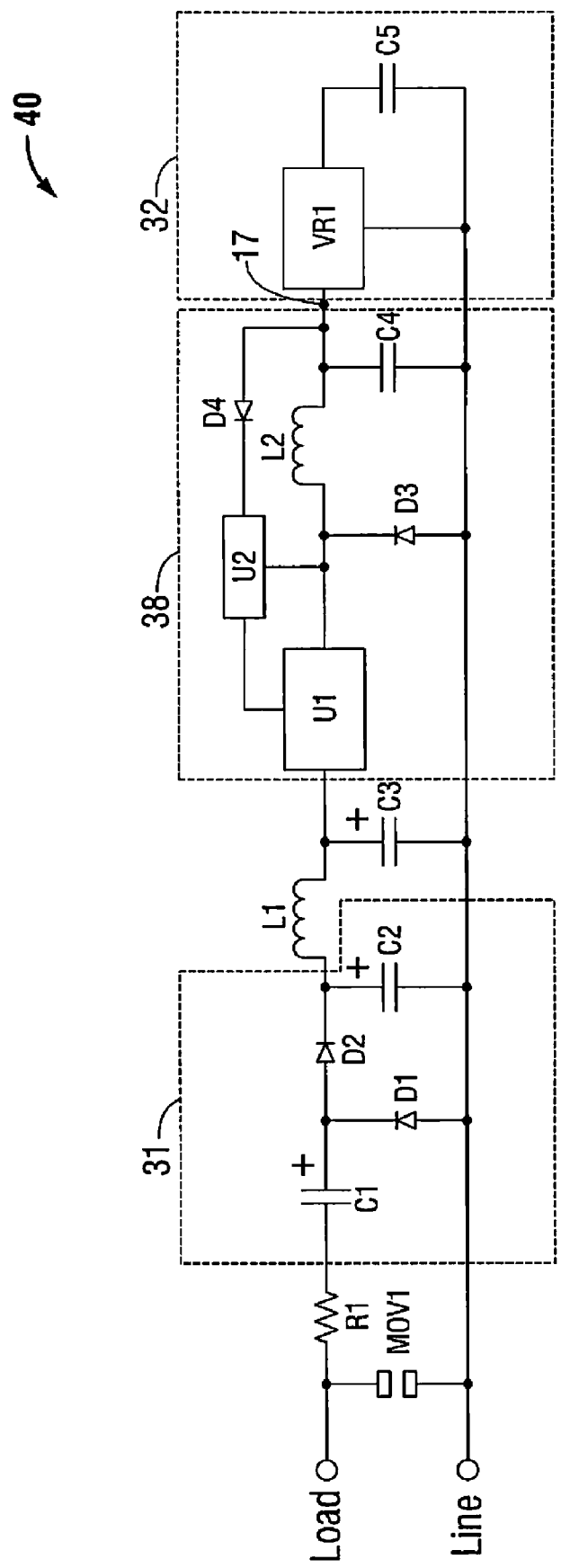
FIG. 4 is a circuit diagram for a power supply circuit in accordance with an embodiment of the invention.

Referring to FIG. 4, there is shown a circuit diagram for a circuit 40 realizing the block diagram of FIG. 3. Circuit 40 includes a metal-oxide varistor MOV1 for surge protection, a fusible resistor R1 providing overcurrent protection, voltage doubler 31, and an LC filter upstream of the switching power supply 38. Diode D1 and capacitor C1 represent the first stage of the voltage doubler. During the positive half of the AC cycle (line voltage high and neutral voltage low, e.g. T0 to T2 as shown in FIG. 2), diode D1 conducts and charges capacitor C1. During the negative half of the AC cycle, the DC voltage stored on capacitor C1 is added to the AC component and applied to capacitor C2 through the diode D2. During the negative half of the AC cycle (e.g. T2 to T4 in FIG. 2) the diode D1 is off. The resulting voltage is filtered by the LC filter comprising inductor L1 and capacitor C3. The output of the LC filter is fed to the input of power switcher U1, based in this particular embodiment on a LinkSwitch®-TN device from Power Integrations, Inc. (See article "LinkSwitch® -TN Family, Lowest Component Count, Energy Efficient Off-Line Switcher IC" dated March 2005, which is incorporated herein in its entirety by reference.) Diode D3, inductor L2 and capacitor C4 realize a buck converter scheme, familiar to those skilled in the art, with diode D4 and resistor-capacitor feedback network U2 providing feedback to the power switcher U1. (Details of implementation of the feedback circuit are described in "LinkSwitch® -TN Design Guide Application Note AN-37" dated May 2005, which is incorporated herein in its entirety by reference. The output 17 of the power supply is fed into regulator 32 before being applied to the dimmer circuits 19. Regulator 32 includes linear voltage regulator VR1 and output capacitor C5.

In this embodiment, power supply 38 is a non-isolated switching power supply with feedback determining the output voltage. It will be appreciated that an isolated power supply may also be used. In addition, the input of circuit 40 may be connected to an AC source other than the line and load terminals as shown in FIG. 4. For example, the input may be provided by a transformer, AC divider, filter or other circuit.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

I claim:

1. A power supply circuit for providing power to internal circuits of a lighting dimmer device adapted to be connected to a source of AC potential, comprising:
    a switching device having a line connection terminal adapted to connect to said source of AC potential and a load connection terminal adapted to connect to a load, wherein during an ON state said switching device conducts said source of AC potential through said load and during an OFF state said switching device impedes said source of AC potential from conducting through said load;
    a voltage multiplier adapted to be coupled to said source of AC potential and to said load connection terminal to provide an output signal, wherein said voltage multiplier charges said output signal during said OFF state of said switching device to about at least twice a peak voltage of said source of AC potential during when said switching device is in said OFF state;
    a switching power supply coupled to said voltage multiplier to receive, as an input potential, said output signal from said voltage multiplier; and
    a linear post regulator interposed between said switching power supply and said internal circuits.

2. A power supply circuit according to claim 1, wherein the voltage multiplier is a voltage doubler.

3. A power supply circuit according to claim 1, wherein the switching power supply is a non-isolated power supply.

4. A power supply circuit according to claim 1, wherein the switching power supply includes a feedback circuit.

5. A power supply circuit according to claim 1, further comprising a filter circuit interposed between the voltage multiplier and the switching power supply.

6. A power supply circuit according to claim 1, wherein said source of AC potential includes a line terminal, said line terminal being accessible for direct connection to components of the dimmer device.

7. A power supply circuit according to claim 1, wherein said source of AC potential is from one of AC mains power, a transformer, an AC divider, and a filter.

8. A power supply circuit according to claim 1, wherein the voltage multiplier is a voltage tripler.

9. A power supply circuit according to claim 1, wherein said load terminal being accessible for direct connection to components of the dimmer device.

10. A power supply circuit according to claim 1, wherein said source of AC potential represents a train of pulses and the switching power supply is utilized to power devices other than dimmers connected to said source.

11. A power supply circuit according to claim 1, wherein said source of AC potential includes a zero-crossing point at time T0 and a time T1 occurs temporally after said zero-crossing point, wherein said voltage multiplier charges said output signal from about time T0 to at least about time T1.

12. A power supply circuit according to claim 11, wherein said time T1 occurs about when said switching device transitions from said OFF state to said ON state.

13. A power supply circuit according to claim 1, wherein said switching device is in said OFF state for at least one cycle of said source of AC potential thereby said voltage multiplier charges said output signal during said at least one cycle of said source of AC potential to the about at least twice the peak voltage of said source of AC potential.

14. A power supply circuit according to claim 1, wherein the voltage multiplier is one selected from the group consisting of a capacitor-diode network and a transformer.

15. A power supply circuit according to claim 14, wherein the voltage multiplier is a half-wave series multiplier.

16. A power supply circuit according to claim 1, wherein said switching device is configured to operate to maximize said conduction of said source of AC potential through said load throughout at least one cycle of said source of AC potential and, said source of AC potential includes a zero-crossing point at time T0, wherein said switching device is configured to transition from said OFF state to said ON state at a time T1 after a predetermined amount of time after said time T0 and said voltage multiplier drives said output signal substantially throughout said predetermined amount of time.

17. A power supply circuit according to claim 16, wherein said about at least twice said peak voltage of said source of AC potential during when said switching device is in said OFF state is about at least twice a voltage of said source of AC potential at said time T1 whereby said output signal is charged by said voltage multiplier to said at least twice said voltage of said source of AC potential at said time T1.

18. A power supply circuit according to claim 16, wherein said time T1 occurs about when said source of AC potential is a minimum working voltage of said switching device, wherein said voltage multiplier is adapted to charge said output signal to at least twice a voltage of said source of AC potential at said time T1.

19. A power supply circuit for connection to a lighting dimmer device, comprising:
- a switching device having a line connection terminal adapted to connect to a source of AC potential and a load connection terminal adapted to connect to a load, wherein during an ON state said switching device conducts said source of AC potential through said load and during an OFF state said switching device impedes said source of AC potential from conducting through said load;
- a voltage doubler circuit adapted to be coupled to said source of AC potential and to said load connection terminal to provide an output signal, wherein said voltage doubler charges said output signal during said OFF state of said switching device to about twice a peak voltage of said source of AC potential during when said switching device is in said OFF state;
- a filter circuit connected to the voltage doubler circuit and adapted to receive said output signal;
- a switching power supply connected to the filter circuit; and
- a linear regulator circuit connected to the switching power supply and coupled to an internal circuit of said dimmer device.

20. A power supply circuit according to claim 19, wherein the voltage doubler circuit includes a first stage having a first capacitor and a first diode, and a second stage having a second capacitor and a second diode.

21. A power supply circuit according to claim 19, wherein the filter circuit includes an inductor and a capacitor.

22. A power supply circuit according to claim 19, wherein the switching power supply includes a feedback circuit.

23. A power supply circuit according to claim 19, wherein the switching device includes a FET.

24. A power supply circuit according to claim 19, wherein the switching device includes an IGBT.

25. A power supply circuit according to claim 19, wherein the linear regulator circuit includes a linear voltage regulator and a capacitor.

26. A power supply circuit according to claim 19, wherein said source of AC potential is from one of AC mains power, a transformer, an AC divider, and a filter.

27. A power supply circuit according to claim 19, wherein the switching power supply is a non-isolated power supply.

28. A power supply circuit according to claim 19, wherein said dimmer device is variable between an OFF position and a full ON position, and said circuit is effective to provide power for operation of the switching power supply while said dimmer device is in the full ON position.

29. A power supply circuit according to claim 19, wherein the switching device includes a triac.

30. A power supply circuit according to claim 19, wherein said switching device is configured to operate to maximize said conduction of said source of AC potential through said load throughout at least one cycle of said source of AC potential and, said source of AC potential includes a zero-crossing point at time T0, wherein said switching device is configured to transition from said OFF state to said ON state at a time T1 after a predetermined amount of time after said time T0 and said voltage doubler drives said output signal substantially throughout said predetermined amount of time.

31. A power supply circuit according to claim 30, wherein said about twice said peak voltage of said source of AC potential during when said switching device is in said OFF state is about twice a voltage of said source of AC potential at said time T1 whereby said voltage doubler charges said output signal to said twice said voltage of said source of AC potential at said time T1.

32. A power supply circuit according to claim 30, wherein said time T1 occurs about when said source of AC potential is a minimum working voltage of said switching device, wherein said voltage multiplier is adapted to charge said output signal to twice a voltage of said source of AC potential at said time T1.

33. A power supply circuit according to claim 19, wherein the voltage doubler is one selected from the group consisting of a capacitor-diode network and a transformer.

34. A power supply circuit according to claim 33, wherein the voltage doubler is a half-wave series multiplier.

* * * * *